C. FORTESCUE.
ADJUSTABLE AND SAFETY HAT PIN.
APPLICATION FILED SEPT. 27, 1910.
1,036,088.                                    Patented Aug. 20, 1912.
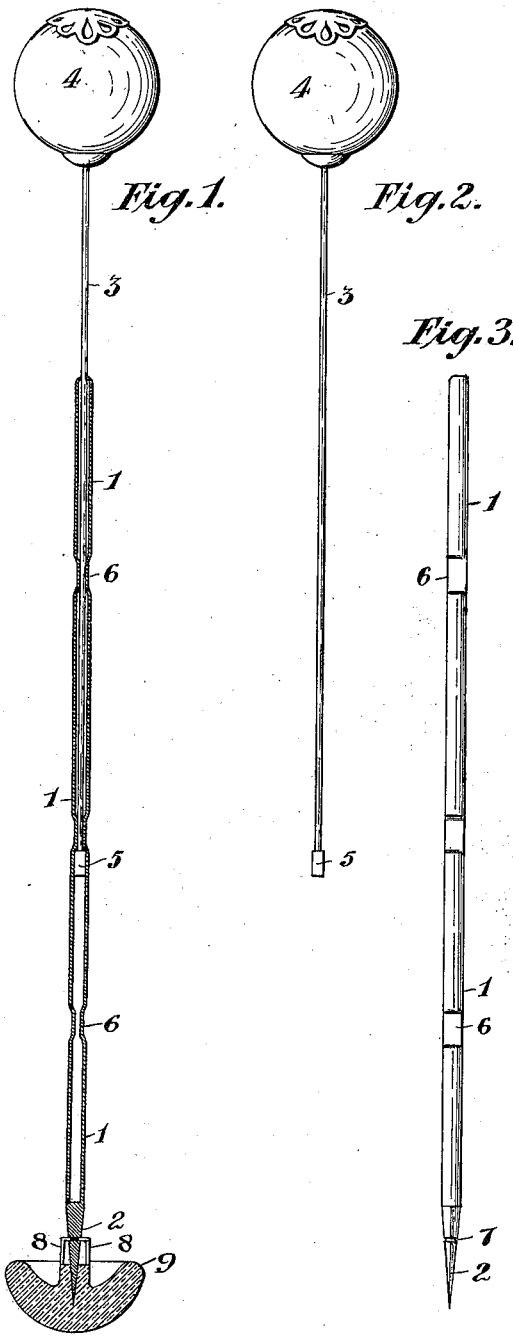

UNITED STATES PATENT OFFICE.

CHARLES FORTESCUE, OF RICHMOND, VICTORIA, AUSTRALIA.

ADJUSTABLE AND SAFETY HAT-PIN.

1,036,088.      Specification of Letters Patent.      Patented Aug. 20, 1912.

Application filed September 27, 1910. Serial No. 584,031.

*To all whom it may concern:*

Be it known that I, CHARLES FORTESCUE, subject of the King of Great Britain and Ireland, residing at 16 White street, Richmond, in the State of Victoria, Commonwealth of Australia, have invented new and useful Improvements in Adjustable and Safety Hat-Pins, of which the following is a specification.

This invention relating to an improved adjustable and safety hat pin has been devised with the object of enabling hats or the like to be securely fastened in position, and at the same time prevent the point of pin projecting, which is often dangerous when ordinary hat pins are used, also to provide a pin the length of which can be adjusted to suit the size of hat.

If desired the pin may be so constructed that the heads may be brought close against the hat, in order that badges may form said heads.

The invention will now be fully described aided by a reference to the accompanying sheet of drawings in which similar numerals of reference refer to the same parts and in which drawings—

Figure 1 is a vertical section of a hat pin constructed according to my invention, while Fig. 2 is a view of the sliding portion of said pin by itself, and Fig. 3 a similar view of the tubular portion.

A hat pin constructed according to my invention is built up mainly of two parts or halves, which are made telescopic, that part or half 1 which is furnished with the point 2 is made from tubular steel as shown, and designed to receive the sliding part of half 3 to the one end of which is secured any suitable head 4. Said sliding part or half 4 is made from steel wire, and is somewhat similar to an ordinary hat pin preferably shorter and without a point, and is designed to slide in said tubular part or half 1. The bottom end of said sliding part or half 3 is flattened to form a stop 5, which, when said sliding part or half is rotated in the tubular half said stop 5 will bear against one of the series of depressions 6 in said tubular half so that the hat pin may be retained at any desired length.

In order to prevent the pin from being pulled apart the top end of the tubular half is burred or bent over against the sliding portion thus preventing the stop 5 passing out of said tube.

The point 2 which is formed on the tubular half 1 may be of any desired shape or form, but preferably of square section as shown, and so constructed that when the point is being passed through the hat and trimming it will not catch or drag same. Said point 2 may be furnished with a recess 7 to receive the jaws of spring clips 8 which are formed on or secured to a head and point protector 9, which not only protects the point, but which prevents the pin from working or falling out of the hat. The point protector, however, forms no part of the present invention.

Having now fully described my invention what I claim and desire to protect by Letters Patent is:—

An adjustable and safety hat pin made in two parts, one of which is tubular and furnished with a point and having interior protuberances, and which tubular part is designed to receive the other part which is made solid having its one end furnished with a head, and its other end formed with a stop, said stop being designed to be passed between or bear against said protuberances, substantially as described and shown and for the purposes specified.

In testimony whereof I have signed my name to this specification in the presence of two subscribing witnesses.

CHARLES FORTESCUE.

Witnesses:
    JOHN DELBRIDGE,
    THOMAS ARTHUR DENNIS.

Copies of this patent may be obtained for five cents each, by addressing the "Commissioner of Patents, Washington, D. C."